United States Patent [19]

Linder

[11] Patent Number: 4,736,718

[45] Date of Patent: Apr. 12, 1988

[54] COMBUSTION CONTROL SYSTEM FOR INTERNAL COMBUSTION ENGINES

[76] Inventor: Henry C. Linder, 131 Biz Point Rd., Anacortes, Wash. 98221

[21] Appl. No.: 28,099

[22] Filed: Mar. 19, 1987

[51] Int. Cl.[4] ............................................. F02B 19/10
[52] U.S. Cl. ................... 123/267; 123/297; 123/525; 123/557; 313/120; 313/143
[58] Field of Search ............... 123/266, 267, 169 V, 123/297, 557, 525, 522; 313/120, 143

[56] References Cited

U.S. PATENT DOCUMENTS

| Re. 29,978 | 5/1979 | Leshner et al. ............... 123/297 |
| 1,223,124 | 4/1917 | Thompson . |
| 2,008,803 | 7/1935 | Stephen . |
| 2,331,912 | 10/1943 | Holthouse, Jr. . |
| 2,390,979 | 12/1945 | Young ............... 123/522 |
| 2,391,220 | 12/1945 | Beeh . |
| 2,461,411 | 2/1949 | Cummings, Sr. ........... 123/522 |
| 3,395,681 | 8/1968 | Walker . |
| 3,406,667 | 10/1968 | Evans et al. . |
| 3,479,997 | 11/1969 | Fryer et al. . |
| 3,502,055 | 3/1970 | Beesch . |
| 3,665,902 | 5/1972 | Bloomfield . |
| 3,713,429 | 1/1973 | Dwyre . |
| 3,728,092 | 4/1973 | Gorman, Jr. . |
| 3,749,376 | 7/1973 | Alm et al. . |
| 3,752,134 | 8/1973 | Hollis, Jr. . |
| 3,763,834 | 10/1973 | Geiger et al. . |
| 3,800,533 | 4/1974 | Zankowski ............... 123/522 X |
| 3,800,768 | 4/1974 | Rhodes et al. ............... 123/522 |
| 3,832,985 | 9/1974 | Edde . |
| 3,851,663 | 12/1974 | Shih . |
| 3,888,223 | 6/1975 | Mondt . |
| 3,905,343 | 9/1975 | Ryan . |
| 3,908,625 | 9/1975 | Romy . |
| 3,927,300 | 12/1975 | Woda et al. . |
| 4,003,356 | 1/1977 | Naylor . |
| 4,015,569 | 4/1977 | Leshner et al. . |
| 4,044,742 | 8/1977 | Linder . |
| 4,074,664 | 2/1978 | Rollins . |
| 4,085,719 | 4/1978 | Hamburg et al. ............... 123/557 |
| 4,177,778 | 12/1979 | Naitou et al. . |
| 4,177,779 | 12/1979 | Ogle . |
| 4,181,111 | 1/1980 | Sanada et al. . |
| 4,232,643 | 11/1980 | Leshner et al. . |
| 4,319,552 | 3/1982 | Saver et al. ............... 123/267 X |
| 4,368,712 | 1/1983 | Jackson et al. ............... 123/522 X |
| 4,524,730 | 6/1985 | Doell et al. ............... 123/525 X |

FOREIGN PATENT DOCUMENTS 883533  11/1981  U.S.S.R. ......................... 123/266

OTHER PUBLICATIONS

Automotive Engineering, Apr. 1985, pp. 57–63.
SAE Paper No. 660094, "Project Stratofire", by Keith Rhodes, Jan. 1966.

Primary Examiner—Tony M. Argenbright
Attorney, Agent, or Firm—H. Albert Richardson, Jr.

[57] ABSTRACT

A combustion control system for internal combustion engines which includes a novel spark plug having a precombustion chamber in which a butane/air mixture injected through the plug is ignited in order to initiate and manage combustion wave propagation within the engine cylinder. The system also includes a fuel system to provide gasoline at an elevated pressure to the fuel metering system of the engine and a gaseous air/butane mixture under pressure to the spark plugs.

14 Claims, 3 Drawing Sheets

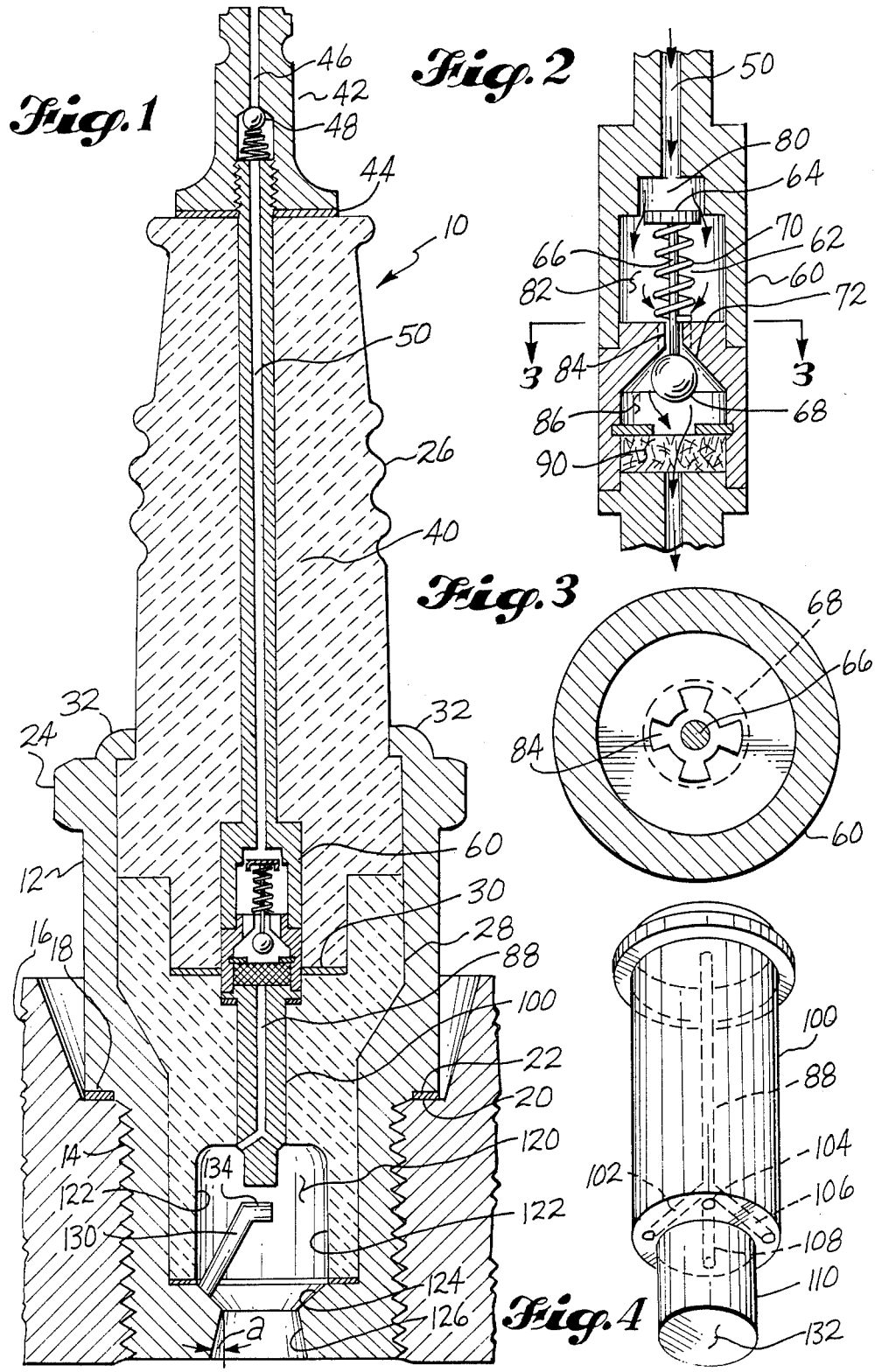

COMBUSTION CONTROL SYSTEM FOR INTERNAL COMBUSTION ENGINES

BACKGROUND OF THE INVENTION

This invention generally relates to internal combustion engines and more particularly to a combustion control system for such engines.

In recent years, much effort in the automobile and petroleum industries has been directed toward controlling the manner in which ignition, flame propagation, and combustion take place within each cylinder. For example, the use of tetraethyl lead additives to suppress detonation, combustion chamber design changes, swirl charges, automatic ignition timing controls, and high-energy spark devices, have all contributed to the control of combustion.

One of the most important recent changes in fuel composition has been the removal of lead-based anti-knock compounds to eliminate lead oxide emissions from the exhaust. Effective non-polluting substitutes for the lead compounds have not been found so the octane ratings of presently available "unleaded" fuels have been significantly reduced.

Cylinder detonation or "knock" has been a most difficult problem to deal with. When a fuel/air mixture in an engine cylinder is ignited by a spark plug, there is approximately a five and one-half ($5\frac{1}{2}$) millisecond delay before a flame front is established. Thereafter the combustion wave front expands in a relatively uniform manner. Shortly, however, as heat and pressure increase and before the wave front reaches the opposite side of the cylinder wall, the unburned fuel ahead of the front suddenly explodes, creating sound waves that hammer against the cylinder and piston resulting in vibrations which are heard as "engine knock". The reason that the unburned fuel prematurely explodes is because it was raised to its ignition threshold by the elevated heat and pressure in advance of the combustion wave front. As engine load increases, the tendency of the fuel/air mixture to detonate also increases.

Detonation is a serious problem because it results in loss of engine power, a reduction in efficiency and an increase in engine operating temperature. If allowed to persist, it will ultimately damage or destroy the engine. The detonation problem was substantially solved in the 1930s by the discovery that the addition of certain lead compounds to gasoline materially reduced the tendency of certain radical molecules to prematurely explode. A radical molecule, such as hydroperoxide ($HO_2$), is formed by the partial breakdown of larger molecules in the presence of air. Given enough time during flame propagation, these radicals congregate just ahead of the wave front and somewhere in the second half of the flame travel, become a direct cause of autoignition of the remaining unburned portion of the cylinder charge, resulting in detonation. The tetraethyl lead compounds previously contained in gasoline, would turn to lead oxide in the cylinder and act as a radical "trap". The combined effect of the removal of those lead compounds from modern fuels, and the use of higher air-to-fuel ratios has resurrected the problem.

One solution commonly employed in currently available engines, is to reduce the compression ratio. That solution is not satisfactory because it does not entirely solve the problem and reduces engine efficiency.

Another solution which has been suggested to produce more uniform and complete combustion of rarified fuel mixtures, involves the use of a so-called "stratified" charge in the combustion chamber. The cylinder of an engine designed to operate with a stratified charge normally includes a main cylinder in which the piston reciprocates and a smaller auxiliary chamber in communication with the upper portion of the main cylinder. In operation, a small quantity of relatively rich fuel mixture is placed in the auxiliary chamber near the time of ignition and is ignited by a spark plug located in the auxiliary chamber. The combustion wave front originates in the auxiliary chamber and spreads into the main chamber, causing a multipoint ignition of the leaner main fuel charge. While engines of this design have enjoyed limited success, they have not seen wide-spread commercial use because of their limited effectiveness.

A third solution has been the use of high-energy ignition (HEI) which is designed to "force" a high voltage current to cross the gap of the spark plug electrodes while the spark plug is operating in leaner fuel/air mixtures. Although successful to date, it does require the ignition system to operate within rather critical parameters.

Accordingly, it is an object of this invention to provide for a combustion control system which will significantly reduce the problem of detonation in engines operating with lower octane, lead-free fuels, and do it without any modification of engine designs.

Recent research has shown that octane, a gasoline fraction twice as large as butane, breaks in half to form additional butane during the combustion process. With an overabundance of butanes (with their fast flame speed) in the second half of the engine combustion cycle as a contributing factor in the cause of detonation, it becomes an object of this invention to "shift" most of the butanes contained in gasoline, using them to not only initiate combustion, but also to increase the flame propagation speed so that a normal flame front will reach the opposite side of the combustion chamber before detonation can "set up".

It is yet another object of this invention to provide for a combustion control system in which normally wasted engine heat is used to remove most of the butanes from the gasoline fuel supply just prior to its use in the engine.

Finally, it is a further object of this invention to provide for a combustion control system which includes a combined spark plug and precombustion chamber into which a butane/air mixture is injected and ignited in order to initiate and manage combustion wave propagation within the engine cylinder.

SUMMARY OF THE INVENTION

This invention can be most broadly summarized as a combustion control system for an internal combustion engine which includes a modified spark plug having a base and an insulator disposed within the base. The insulator has a precombustion chamber formed in it. The plug also includes a central electrode which passes through the base, extends into the precombustion chamber and defines a passageway in communication with the chamber for the transmission of a gaseous fuel/air mixture.

The system also includes a temperature control device for heating by-pass fuel to a predetermined temperature for the production of fuel vapors. It further includes means for transmitting the fuel vapors to the modified spark plug.

A BRIEF DESCRIPTION OF THE DRAWINGS

FIG. 1 is a cross-section of the disclosed modified spark plug.

FIG. 2 is a more detailed view of the check valve and flame arrester section of FIG. 1.

FIG. 3 is a cross-section of the check valve taken at 3—3 of FIG. 2.

FIG. 4 is an isometric view of the lower end of the center electrode.

DESCRIPTION OF THE PREFERRED EMBODIMENTS

Figure 5:
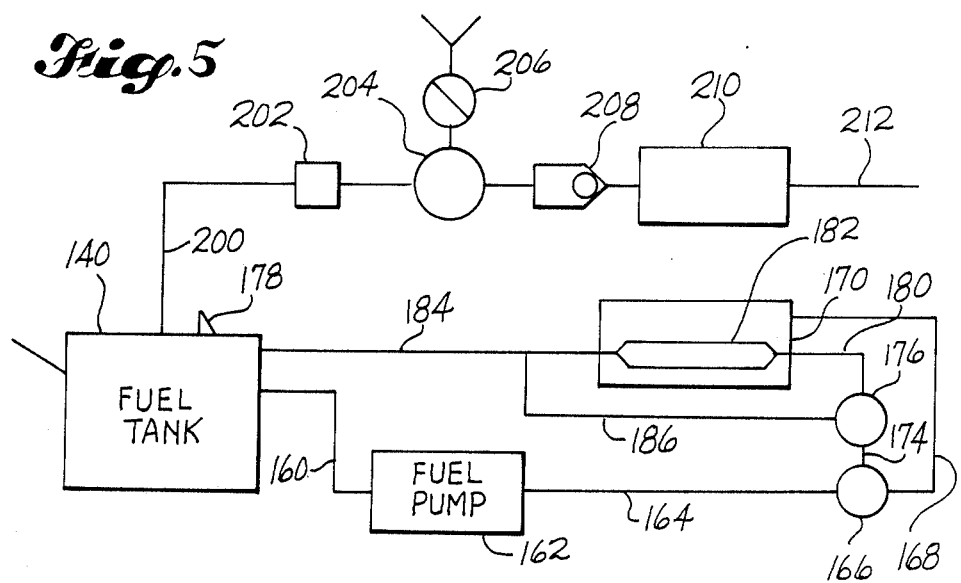
FIG. 5 is a schematic view of the disclosed air/butane vapor generating system.

The novel features to be characteristic of this invention are set forth in the appended claims. The invention itself, however, may be best understood and its various objects and advantages best appreciated by reference to the detailed description below in connection with the accompanying drawings.

In FIGS. 1 through 4 a modified spark plug constructed in accordance with the teachings of this invention is illustrated and generally designated by the numeral 10. The primary purpose of the disclosed modified plug is to permit engines to operate at higher air-to-fuel mixture ratios while substantially reducing the detonation problems found in current engines. When conventional spark plugs are used as an ignition source, certain chemical reactions must take place at the point of ignition before the combustion wave front is established. That delay permits the unburned fuel mixture ahead of the wave front to "set up" for detonation. When the disclosed modified plug is used, the combustion wave is established almost instantly in the main chamber, followed by an increase in flame propagation speed, substantially reducing the likelihood of detonation or "knock".

Referring to FIG. 1, it can be seen that the plug includes a base 12 which is generally cylindrical in shape and has a threaded lower portion 14 which cooperates with a threaded bore in cylinder head 16 to retain the plug in the cylinder head. A seal is achieved between the plug base and the cylinder head by annular gasket 18 which is compressed between shoulder 20 on the cylinder head and shoulder 22 on the plug base when the plug is in position. As with conventional plugs, upper portion 24 of the base, has a series of flats adapted to be engaged by a conventional socket for installation and removal of the plug.

The plug also includes upper and lower insulators 26 and 28, each of which is preferably made of sintered ceramic material having a high dielectric constant and which is able to withstand thermal shock. The two insulators are separated by seal 30 and are held in position in the base by bead 32 which is formed after the insulators are installed in the base during assembly.

Extending downward along the axis of each insulator is center electrode 40 which has two important functions. It conducts electrical current under high voltage from the ignition wire (not shown) and also transmits butane/air vapors into the precombustion chamber within the plug as described below. Vapors are supplied to the plug by a supply line (not shown in this view) which is attached to the top of connector 42 by a quick-release fitting (also not shown). In addition to providing a point of connection for the vapor supply line, the cap functions as a connection for the ignition lead (also not shown) to the center electrode. The cap is threaded onto the top of the center electrode as shown and is spaced from the upper surface of insulator 26 by gasket 44.

The injection system will provide controlled period injection of vapors into the plug and will provide longer periods of injection for starting and under load conditions that would tend to cause detonation. Longer injection periods during high engine load conditions will not only fill the precombustion chamber of the plug, but will place a butane/air mixture in front of the plug to assist in accelerating the combustion wave front across the combustion chamber of the cylinder.

When gasoline is used as fuel for the engine, normal butane and isobutane removed from the gasoline are injected into the plug. They are convenient to use because they are the only components of the gasoline that will remain in the gaseous state at normal temperatures and pressures after removal from the gasoline. Also, unlike most of the more complex molecules found in gasoline, they are resistant to thermal breakdown with associated deposits of carbon at the operating temperatures found in the precombustion chamber of the plug.

The timing and rate of flow of butane/air vapors into the plug are controlled electronically by means well known to those of ordinary skill in the art and described below in greater detail. The vapors enter the plug through the cap through passageway 46, forcing open ball check valve 48. After passing the valve they continue downward through central passageway 50 and enter checkvalve section 60 in the center electrode which is shown in greater detail in FIG. 2. Located within section 60 is valve assembly 62 which includes valve actuator 64, valve stem 66, ball valve 68 and valve spring 70 which biases the valve upward toward a closed position and against seat 72. Vapors entering the valve section from passageway 50 enter chamber 80 and force the actuator 64 downward, compressing spring 70 and opening valve 68. After passing around the sides of the actuator the vapors continue downward through chamber 82, passageways 84, around valve 68, through chambers 86 and into flame arrestor 90. Preferably the flame arrester is made of an appropriate porous ceramic material. Passageways 84 are shown in greater detail in sectional view in FIG. 3.

After leaving the flame arrester the vapors continue downward through passageway 88 which is centrally disposed in lower portion 100 of the center electrode. The lower portion is shown in greater detail in FIG. 4. In that view it can be seen that passageway 88 branches into four exit segments 102, 104, 106, and 108. It is important that these passageways be relatively small in diameter to minimize the possibility of a flashback from the combustion chamber. The lower end of the electrode is reduced in diameter to form electrode tip 110 which protrudes downward into precombustion chamber 120.

The precombustion chamber is semi-enclosed in design and is formed in the lower portion of lower insulator 28. It is bounded by wall 122 of the insulator and surfaces 124 and 126 formed in base 12. The angle "a" of surface 126 with respect to the central axis of the plug should not exceed twelve degrees in order that gasses exiting the precombustion chamber will continue to follow the surface and keep it free of carbon deposits. Ground electrode 130 protrudes upward and radially inward from surface 124 and is positioned to form a gap of a predetermined distance between surfaces 132 and 134.

Because the lower insulator is extended downward to form the precombustion chamber, heat generated in the chamber is directed inward and away from the metal base of the plug. Another advantage of this design is that it prevents the spark from tracking along the relatively short horizontal distance from the center electrode to ground on the plug base.

When technology permits, it may be possible to make the entire lower portion of the plug of a sintered ceramic. In that case it would also be necessary to provide a means for grounding and supporting the center electrode such as an integrally mounted band or ring.

This new plug is designed to operate only with gaseous fuel/air mixtures. As stated, a butane mixture is preferred, but other fuels such as propane, methane and natural gas may be used. In extremely cold climates, natural gas would be ideal.

Figure 6:
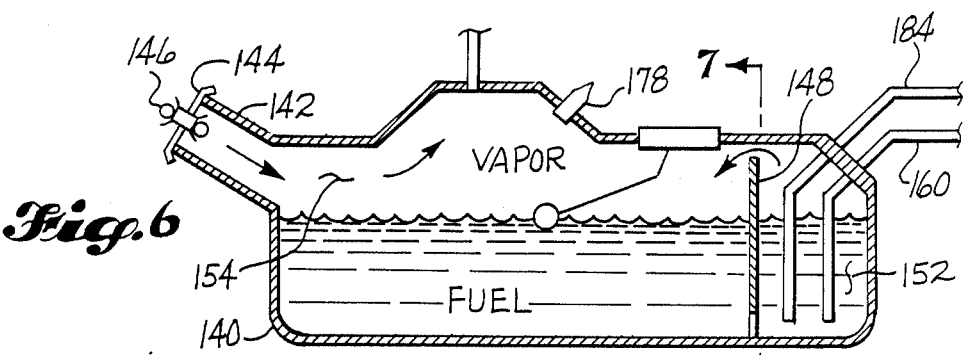
FIG. 6 is a sectional view of the fuel tank of FIG. 5.
Figure 7:
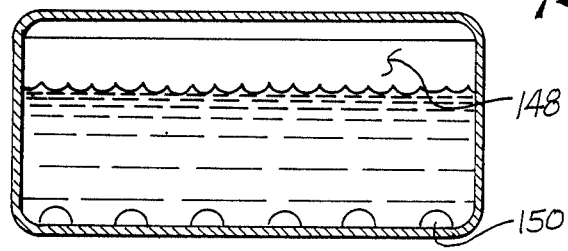
FIG. 7 is a sectional view showing the fuel tank baffle taken at 7—7 of FIG. 6.

FIG. 5 is a schematic diagram of a modified fuel system which is preferred for use with an automobile engine equipped with the modified plug described above. The purpose of the system is to provide gasoline under pressure for use in the primary combustion chamber of the engine and a gaseous butane/air mixture under pressure to the modified plugs described above. Gasoline is stored in a specially designed fuel tank 140 which is illustrated in greater detail in the sectional views of FIGS. 6 and 7. Referring to FIG. 6 it can be seen that fuel is added to the tank through filler neck 142 which is closed by pressure cap 144. The cap contains valve 146 which will retain a small positive or negative pressure differential with the tank. Baffle 148 is transversely mounted in the forward portion of the tank. Openings 150 spaced along the bottom of the baffle permit the flow of fuel between tank compartments 152 and 154. Because the baffle does not extend entirely to the top of the tank, vapors may flow across the top of the baffle between the compartments as shown.

Fuel is drawn from the tank through line 160 by the fuel pump 162 which transmits the fuel through line 164 to pressure regulator 166. Line 168 transmits fuel at standard pressures to the fuel metering system of the engine. Line 174 transmits by-pass fuel at reduced pressure to two-way valve 176 which is controlled by vapor sensor 178 mounted near the top of fuel tank 140. If the vapor sensor indicates that there is an inadequate amount of butane vapor in the tank, valve 176 is positioned to direct the by-pass fuel through line 180 into a special augered or spiraled section 182 of temperature control unit 170 where the fuel is heated to remove butanes. Butane vapors and the remaining liquid fuel are then returned to fuel tank 140 through line 184. If sensor 178 indicates that sufficient vapors are present in the tank, it positions valve 176 so as to direct by-pass fuel around the temperature control unit through line 186 and into line 184 where it is returned to the fuel tank.

Temperature control unit 170 is a device described in U.S. Pat. No. 4,044,742 issued to the Applicant on Aug. 13, 1977, which utilized hot water from the engine cooling system and cold water which is made cold by passing engine hot water through a heat exchanger mounted in the engine intake air stream.

The upper portion of the gas tank will act as a condensing area for the separated gasoline fractions leaving the temperature control 170 since any fractions heavier than the butanes that do not remain in air suspension at normal ambient temperatures and pressures will return to the liquid state.

Butane vapors to be used in the plugs are drawn from the fuel tank through line 200 by pressure pump 204. It is necessary that the butanes be mixed in proper proportion with air for use in the plugs so a butane/air ratio sensor 202 is positioned in line 200 just upstream of pump 204 to sense this ratio. If additional air is necessary, it can be drawn through check valve 206 which is controlled by sensor 202. Vapors leaving the pump are passed through one-way check valve 208 and into storage tank 210.

Figure 8:
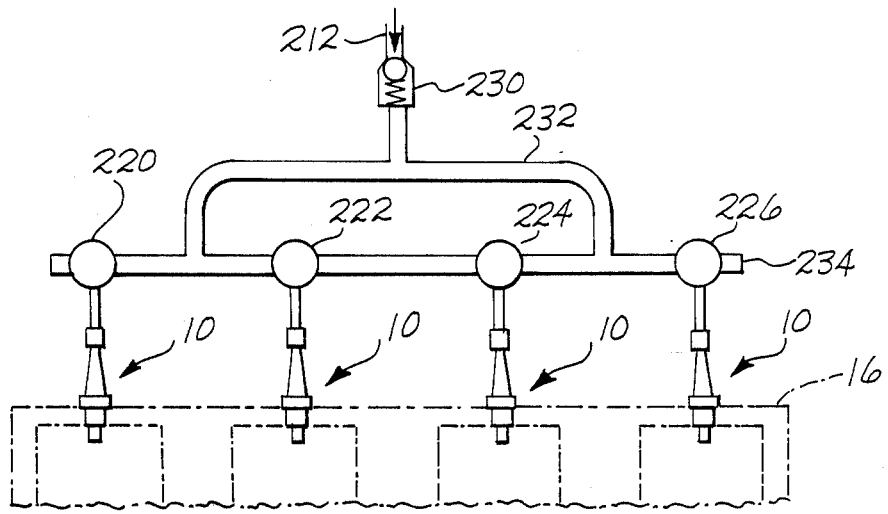
FIG. 8 is a schematic view of the air/butane vapor manifold assembly.

FIG. 8 schematically illustrates the manifold system by which butane/air vapors are distributed to the plug. Flow into each plug 10 is controlled by an associated solenoid valve 220, 222, 224, 226, etc., which are each in turn controlled electronically by means well known to those of ordinary skill in the art. Upon the opening of one or more of the solenoid valves, butane/air vapors under pressure are passed from storage tank 210 through line 212 and check valve 230 and pass onward through distribution rails 232 and 234 to the solenoids.

The construction of the modified spark plug is such that if the butane/air system supplying the modified plug fails, the engine could continue to operate with the plugs functioning as standard spark plugs.

There are a number of additional benefits to be gained from the use of this combustion control system. Stratification of the engine cylinder will allow leaner fuel/air mixtures in the main cylinder especially during cruise conditions with associated fuel savings, along with lower exhaust emissions including nitrous oxide. The modified spark plug will provide for good ignition under all operating conditions because of the richer fuel/air mixtures in the precombustion chamber. Since the butanes are the most temperature-stable of all the gasoline fractions, they will not deposit carbon inside the plug precombustion chamber. For cold starting, automatic lengthening of the plug injection "on" time will be ideal. Because the butanes have an octane rating of approximately 92, a lengthened plug injection "on" time during heavy engine load conditions will raise the octane rating of the overall cylinder charge and thus help suppress detonation. With sufficient stored vapors, the engine can idle on plug injection alone.

A particular hurdle to overcome in this type of fuel system is carbon accumulation in any area that operates in excess of 1020 degrees Fahrenheit. The first gasoline fractions to "crack" or thermally break down and deposit carbon are the heaviest ones, starting with Xylene which begins to break down at about 1022 degrees Fahrenheit. At the other end of the spectrum the lightest gasoline fractions, namely the butanes, are the most temperature-stable and do not begin to break down until the temperature reaches approximately 1300 degrees Fahrenheit. Even then, that temperature would have to be sustained for a full minute in order to obtain seventy-five percent decomposition. Because the precombustion chamber of the instant plug operates at temperatures below 1300 degrees Fahrenheit, there should be no carbon deposits as long as a temperature-stable fuel such as butane is used.

To be the most effective, this combustion control system should be electronically coordinated with standard electronic fuel injection in the primary portion of the fuel system. In that way, there would be automatic enrichment injection at the plugs for cold starting and automatic leaning of the primary injection system during idle, cruise, and light engine load conditions.

Considering the amount of butanes contained in "summer" blended gasolines, and the preferred volume of the instant plug precombustion chamber, it is estimated by the inventor that only about 1/7th of that amount would be needed for the plugs to provide engine stratification, leaving the remainder available for starting, combustion wave and detonation control, and idle mixtures.

Thus it could be seen that the present invention provides for a combustion control system which incorporates many novel features and offers significant advantages over the prior art. Although only one embodiment of this invention has been illustrated and described, it is to be understood that obvious modifications can be made of it without departing from the true scope and spirit of the invention.

I claim:

1. modified spark plug for internal combustion engines comprising:
   a base made of an electrically conductive material and adapted to be installed in the engine;
   an insulator disposed within the base and having a precombustion chamber formed therein;
   a central electrode passing through the insulator, extending into the precombustion chamber and defining a passageway in communication with the precombustion chamber for the transmission of a gaseous fuel/air mixture; and,
   a spring operated check valve assembly for controlling the flow of said fuel/air mixture through said passageway, said assembly being disposed within said insulator and spaced from said precombustion chamber.

2. The modified spark plug of claim 1 wherein said check valve assembly further includes an actuator, a valve, a valve stem interconnecting the actuator and the stem; and means for biasing the valve toward a closed position.

3. The modified spark plug of claim 1 wherein said base includes a lower portion defining a nozzle for gasses leaving the precombustion chamber.

4. The modified spark plug of claim 1 wherein said base includes a lower portion defining a nozzle for flame leaving the precombustion chamber.

5. A fuel system for providing a gaseous butane/air mixture and liquid gasoline for an internal combustion engine comprising:
   a tank for storing gasoline;
   temperature control means in communication with the tank for heating gasoline to a predetermined temperature to produce butane vapor and for delivering the vapor to the tank;
   means for controllably mixing air with the butane vapor; and,
   means in communication with said tank for transmitting the butane/air mixture and gasoline to the engine.

6. The fuel system of claim 5 further including means for storing butane vapor, means associated with said butane vapor storing means for sensing the quantity of butane stored therein, and means responsive to said quantity sensing means for controlling the production of butane vapor by said temperature control means.

7. The fuel system of claim 5 wherein said mixing means includes means for sensing the ratio of butane vapor to air at a preselected location in the system and means responsive thereto for mixing air with the butane vapor.

8. The fuel system of claim 5 further including means associated with said means for transmitting for increasing the pressure of the butane vapor and electronic means for controllably injecting the vapor into the engine.

9. A combustion control system for an internal combustion engine comprising:
   a modified spark plug including a base made of an electrically conductive material, an insulator disposed within the base and having a precombustion chamber formed therein and a central electrode passing through the insulator, extending into the precombustion chamber and defining a passageway in communication with the precombustion chamber for the transmission of a gaseous fuel/air mixture;
   a tank for storing fuel;
   temperature control means in communication with the tank for controllably producing fuel vapor;
   means for storing fuel vapor, means associated therewith for sensing the quantity of stored vapor and means responsive to said quantity sensing means for controlling the production of fuel vapor by the temperature control means; and,
   means in communication with the tank for transmitting fuel to the engine and fuel vapor to the modified spark plug.

10. The combination control system of claim 9 wherein the modified spark plug further includes a spring operated check valve assembly for controlling the flow of said fuel/air mixture through said passageway, said assembly being disposed within said insulator, spaced from said precombustion chamber and including a flame arrester.

11. The combustion control system of claim 9 wherein said check valve assembly further includes means for biasing the valve toward a closed position.

12. The combustion control system of claim 9 further including means in communication with said vapor storing means for sensing the ratio of fuel vapor to air at a preselected location in the system and means responsive thereto for mixing air with the fuel vapor.

13. The combustion control system of claim 9 further including means associated with the means for transmitting for increasing the pressure of the fuel vapor and electronic means for controllably injecting the vapor into the modified spark plug.

14. A combustion control system for an internal combustion engine comprising:
   a modified spark plug including a base made of an electrically conductive material, an insulator disposed within the base and having a precombustion chamber formed therein and a central electrode passing through the insulator, extending into the precombustion chamber and defining a passageway in communication with the precombustion chamber for the transmission of a gaseous fuel/air mixture;
   a tank for storing liquid gasoline;
   temperature control means in communication with the tank for heating gasoline to a predetermined temperature to produce butane vapor and for delivering the vapor to the tank;

means for storing the butane vapor, means associated therewith for sensing the quantity of stored vapor and means responsive to said quantity sensing means for controlling the production of butane vapor by the temperature control means;

means in communication with said vapor storing means for sensing the ratio of butane vapor to air at a preselected location in the system and means responsive thereto for mixing air with the vapor;

means in communication with the tank for transmitting fuel to the engine and butane vapor to the modified spark plug; and, means associated with the means for transmitting for increasing the pressure of the butane vapor and electronic means for controllably injecting the vapor into the modified spark plug.

* * * * *